June 21, 1960     I. R. AXELRAD     2,942,116
NEUTRON ABSORPTION AND SHIELDING DEVICE
Filed Nov. 22, 1955
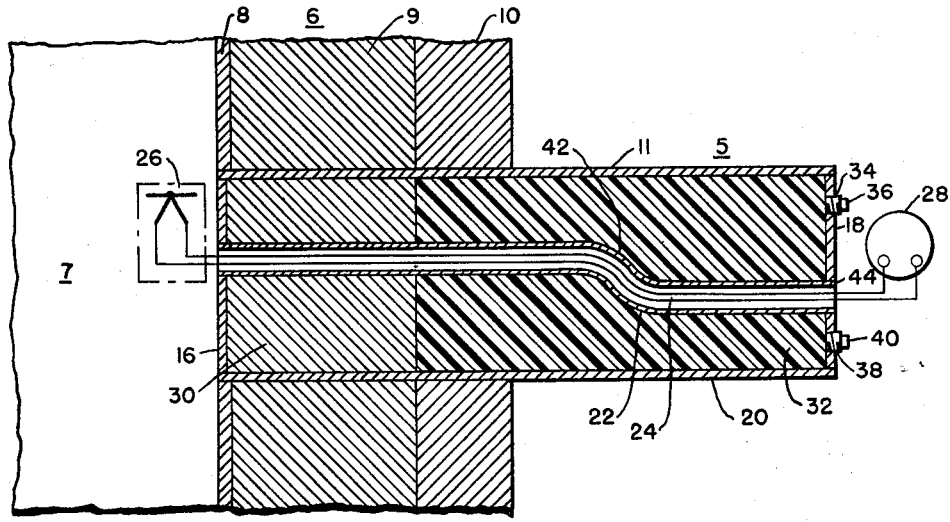
WITNESSES:
INVENTOR
Irving R. Axelrod
BY
ATTORNEY

2,942,116

NEUTRON ABSORPTION AND SHIELDING DEVICE

Irving R. Axelrad, Pittsburgh, Pa., assignor, by mesne assignments, to the United States of America as represented by the United States Atomic Energy Commission Filed Nov. 22, 1955, Ser. No. 548,519

1 Claim. (Cl. 250—108)

The present invention relates to neutron absorption and shielding devices adapted for mounting in a radiation shielding wall surrounding a radioactive area.

In the building of atomic reactors, shielding against radiation is of prime importance. In general, the reactor or radioactive area is surrounded by a wall wherein the primary radiation shielding material is lead and the secondary shielding material is a high hydrogen content material such as polyethylene.

Instrumentation leads must be brought out from the radioactive area through the surrounding shielding wall. It has been a considerable problem to provide shielding about such leads and to provide shielding about the opening in the shielding wall through which such leads pass.

The object of the present invention is to provide a neutron shielding device adapted for mounting in a radiation shielding wall surrounding a radioactive area through which instrumentation leads and the like may safely pass without permitting gamma or neutron radiation to pass to the exterior.

A further object of this invention is to provide a neutron shielding device of the character described having at least one non-rectilinear tube or passageway means extending therethrough, which is adapted to contain instrumentation leads or the like, and a quantity of a solid material completely filling the device which is adapted to prevent passage of gamma radiation and to attenuate fast moving neutrons and capture slow moving or thermal neutrons.

Other and further objects of the invention will, in part, be obvious and will, in part, appear hereinafter.

In the attainment of the foregoing objects and in accordance with the present invention, there is provided a neutron absorption and shielding device or casing comprising (1) a container having, (2) at least one non-rectilinear passageway means therethrough, (3) a layer of a substance capable of absorbing gamma rays therein, and (4) a solid resinous composition therein adapted to attenuate fast moving neutrons and capture slow moving or thermal neutrons.

More specifically, the neutron absorption and shielding device of this invention is embodied in a container adapted for mounting in a radiation shielding wall surrounding a radioactive area. The container is closed at both ends and has at least one non-rectilinear passageway means or tube extending therethrough. One end of the passageway means or tube opens through one end of said container to said radioactive area. The other end of said passageway means or tube opens to the exterior of said radiation shielding wall through the other end of said container.

A layer of a substance, such as lead, capable of absorbing gamma rays is disposed within the container across the entire end thereof which is nearest to the radioactive area. Said layer extends a substantial distance along the length of said container from the end thereof nearest to the radioactive area and surrounds the passageway means and completely fills the container throughout said distance.

A solid resinous composition, capable of attenuating fast moving neutrons and capturing slow moving or thermal neutrons, completely fills the balance of the container and surrounds the remainder of the length of the passageway means or tube. The solid resinous composition comprises (1) a resinous material having a high hydrogen atom content, specifically a resin having a ratio of hydrogen atoms to all other atoms in the material within the range of from 1:1 to 2:1, and (2) boron in an amount of at least 0.5 percent by weight based on the total weight of the resinous composition. The resinous composition is disposed within the container in such a manner and in such an amount whereby approximately 40% of the length of said resinous composition will attenuate and absorb substantially all neutrons impinging on the end wall of the casing nearest to the radioactive area.

The container and passageway means or tube are of such a structure and are assembled in such manner with the resinous composition whereby any straight line passing through the end of the passageway means or tube from the radioactive area will pass through at least 40% of the total length of said resinous composition within the container.

To indicate more fully the advantages and capabilities of the present invention, reference is made to the following description taken in conjunction with the accompanying drawing which by way of illustration, shows one preferred embodiment of the invention.

Other embodiments of the invention employing the same or equivalent principles may be used and structural changes may be made therein as desired without departing from the purview of the present invention as defined in the appended claim.

Referring to the accompanying drawing, the invention as therein illustrated is embodied in a neutron absorption and shielding device or casing, referred to generally by reference numeral 5, which is adapted for mounting in a radiation shielding wall, referred to generally by reference numeral 6, which surrounds a radioactive area, referred to generally by reference numeral 7. Shielding wall 6 as illustrated comprises three shielding layers, namely, a layer of steel 8, lead 9 or other substance capable of absorbing gamma rays, and a high hydrogen content shielding material 10. The casing 5 comprises a container 11 which is illustrated as a generally cylindrical metal can having end walls 16 and 18 and a generally circular side wall 20. The shape of container 11 need not be circular. Thus, side wall 20, when viewed in cross section, may be square, hexagonal, octagonal or the like. Container 11 may be made from various materials, for example, metals such as stainless steel, cast iron, copper, and the like, or ceramics such as porcelain. Container 11 may be mounted in shielding wall 6 in any convenient manner, for example, as by welding or soldering, or it may be threaded and screwed into wall 6.

A non-rectilinear passageway means or tube 22 extends longitudinally through container 11. One end of said passageway means or tube opens through end 16 of container 11 to said radioactive area 7. The other end of tube 22 opens to a less radioactive area, for example, to the exterior of the radiation shielding wall 6 through the end 18 of container 11. Tube 22 may be secured in end walls 16 and 18 of container 11 in any convenient manner such as by soldering, welding or the like. As will be explained more fully hereinafter, it is essential that the tube 22 be non-rectilinear. The particular shape, however, of tube 22 is immaterial. Thus, the tube may have an S-curve, it may be spiral in shape or possessed of any other generally non-rectilinear configuration whereby radiation cannot pass completely through it in a straight line.

Tube 22 may be made from any conveniently obtainable material of construction such as metals or ceramics.

As illustrated on the drawing, tube 22 has a relatively small cross-sectional area with respect to the cross-sectional area of container 11.

Tube 22 is adapted to contain at least one instrumentation lead 24. As illustrated on the drawing, lead 24 connects an instrument such as a thermocouple 26, within the radioactive area 7, to a meter such as a potentiometer 28 or the like located exteriorly of shielding wall 6. While only one tube 22 is illustrated on the drawing, it will be understood, of course, that a plurality of such tubes of similar or different non-rectilinear shape may be mounted in container 11. Furthermore, it will be understood that one or more casings 5 may be mounted in shielding wall 6 surrounding the radioactive area 7.

A layer 30 of a substance which is capable of absorbing gamma rays, for example, lead, is disposed within container 11 at the end thereof which is nearest to radioactive area 7. As illustrated on the drawing, the lead layer 30 extends a substantial depth within the container 11 from end wall 16 and surrounds tube 22 and completely fills container 11 throughout said depth. The thickness of the layer of lead 30 may be varied, it only being necessary that the layer be of a sufficient thickness to absorb substantially all of the gamma rays directed against wall 16 from radioactive area 7. While lead is the preferred material to use for absorbing gamma rays, other materials such as concrete, bismuth, or barium salts also are suitable for use in accordance with this invention.

A solid resinous composition 32, which is capable of attenuating fast moving neutrons and capturing slow moving or thermal neutrons, completely fills the balance of container 11 and surrounds the remainder of the length of tube 22. The resinous composition is a combination of two materials: (1) a resinous material having a high hydrogen content, more specifically a material having a ratio of hydrogen atoms to all other atoms in the material within the range of from 1:1 to 2:1 and (2) at least 0.5 percent by weight of boron.

The high hydrogen content resinous material serves the primary function of attenuating fast moving neutrons. The resinous materials which are suitable for use include those which are normally either liquids or relatively high viscosity pasty-like fluids which cure to solids on heating. Example of resinous materials which are suitable include polyesters, castable phenol-aldehyde resins; butadiene polymers and copolymers thereof with styrene, polyethylene, and butadieneacrylonitrile copolymers.

Other high hydrogen content resinous materials which are suitable for use for attenuating fast moving neutons comprise material known as plastisols. These are dispersions of a resin (or a material which forms a resin when admixed with a plasticizer) in a plasticizer. Examples of such resins include chloroprene polymers and copolymers; vinyl halide and vinylidene halide resins such as polyvinyl chloride, polyvinylidene bromide, polyfluorochloroethylene; vinyl chloride and vinylidene chloride copolymers; copolymers of vinyl halides and vinylidene halides with other unsaturates such as vinyl chloride with vinyl acetate, vinylidene bromide with vinyl acetate, and ethylene with vinyl chloroacetate; halogenated high molecular weight natural resins and hydrocarbons such as the commercially available halogenated paraffin waxes, the halogenated natural rubbers, and the like.

Examples of plasticizers which are suitable for use in accordance with this invention include di-iso-octyl phthalate, dicapryl phthalate, di-n-octyl phthalate, butyl benzyl phthalate, di-2-ethylhexyl phthalate, dibutyl phthalate, di-octyl azelate, dioctyl adipate, dioctyl sebacate, dibenzyl sebacate, tricresyl phophate, tri-iso-octyl phosphate, octyl diphenyl phosphate, tri-2-ethylhexyl phosphate, propylene glycol diacetyl ricinoleate, methyl acetyl ricinoleate, tetrahydrofurfuryl oleate and tetraethylene glycol di-isohexoate. The plasticizers may be used singly or in any suitable admixture of two or more.

Boron, the second component of the resinous composition, is used in amounts within the range of about 0.5% to 10% by weight of the total composition 32 and may be employed either as the pure element or in any of its compounds. Thus, boric acid and boron carbide have been successfully used in accordance with this invention. Borax and boric acid also are satisfactory for use in certain circumstances, although care is required to prevent water evolving therefrom when these latter compounds are incorporated in resinous materials which require heating to cure them to a solid state. Esters of boron such as glyceryl borate also may be used as the resinous composition 32.

The following is an example of the preparation of a resinous composition suitable for incorporation in a casing 5 of this invention.

A resinous composition is prepared by admixing 3% by weight of anhydrous boric oxide, 40% by weight of polyvinyl chloride and enough dioctylphthalate to produce a paste having the consistency of thick cream. This mixture is passed through a three-roll paint mill after which enough additional dioctylphthalate is added to bring the total amount therein up to 57%. The resultant mixture then is passed through the paint mill to obtain a uniform dispersion of the components. This mixture was introduced into a container, such as indicated by 11 on the drawing, which contained a layer of lead 30 therein and an S-shaped tube 22 passing through the center and welded to the end walls thereof 16 and 18. The resinous mixture is introduced into container 11 through an opening 34 in end wall 18 which is closed by plug 36. The resinous composition 32 is introduced into container 11 through opening 34 in a quantity sufficient to fill about four-fifths of the cotnainer. Opening 34 then is closed by plug 36 and a vacuum line, which reduces the pressure within container 11 to ten to fifteen mm. of mercury, is connected to opening 38 in end wall 18. Vacuum is maintained for a period of about one hour to assure the removal of all entrapped air. At the end of this deaerating period, additional de-aerated resinous material 32 is introduced into container 11 through opening 34 to completely fill the container. Plug 36 then is inserted to close opening 34, and plug 40 is placed in position to close opening 38. The container, when completely filled with liquid resinous composition 32, then is placed in a forced-draft oven and heated to 175° C. for a period of 3 hours and then cooled. The resinous material 32 is cured to a solid as a result of this heating operation.

A uniform dispersion of boron through the solid resinous composition 32 is obtained in accordance with the foregoing procedure. A solid casting prepared in this fashion was sectioned and no visible settling of the boron compound was observed. Samples from the bottom and top of the casting were analyzed for boron content and were found to contain 1.11% and 1.06%, respectively.

As illustrated on the drawing, container 11, tube 22, and lead layer 30 are constructed and assembled in such manner whereby any straight line passing through the end of tube 24 from the radioactive area 7 will pass through at least 40% of the total length of resinous composition 32 within container 11. It is essential that the various associated parts be assembled in accordance with this specification to make certain that all neutrons, which generally follow a straight line path, pass through the walls of tube 22 and into resinous composition 32. To insure that all of the neutrons pass out of tube 22 and into resinous composition 32, tube 22 is constructed in such manner that it extends, from end wall 16, in a straight line for a substantial distance through the lead layer 30 and into resin 32 within the container to a bent portion 42 therein and then continues to its terminus 44 in end wall 18 of container 11. The neutrons entering tube 22 from the radioactive area 14 are all moving at a high rate of speed. Such neutrons continue in a straight line and upon reaching bent portion 42 of tube 22 continue on in a straight line path through the side wall of tube 22 and pass out into the resinous composition 32, wherein they are attenuated by the high hydrogen content material and captured by the boron. Satisfactory results are obtained by assembling the components in such manner whereby bent portion 42 of tube 22 is located within the middle one-third of the length of the resinous composition 32.

While the present invention has been described and illustrated with reference to a preferred embodiment thereof, it will be understood, of course, that certain changes, substitutions, modifications and the like may be made therein without departing from its true scope.

I claim as my invention:

A shielding wall surrounding a radioactive area, an opening in said wall, a neutron absorption and shielding device mounted in said opening, said device comprising (1) a container having a cylindrical side wall and closed end walls, (2) at least one non-rectilinear tube extending longitudinally through said container adapted to contain instrumentation leads extending outwardly from said radioactive area through said radiation shielding wall, one end of said tube opening through one end of said container to said radioactive area and the other end of said tube opening into a less radioactive area through the other end of said container, said tube (a) being of relatively small cross-sectional area with respect to the cross-sectional area of said container and (b) extending from the end of the container nearest to the radioactive area in a straight line for a substantial distance through the container to a bent portion and then continuing in a straight line to its terminus in the other end wall of the container, the openings in the ends of the container for the ends of the tube being offset with respect to one another, (3) a quantity of lead completely filling a substantial length of that portion of the container which is nearest to the radioactive area, and (4) a solid resinous composition capable of absorbing neutrons completely filling the balance of said container and surrounding the rest of said passageway means, said composition comprising (a) a resinous material having a ratio of hydrogen atoms to all other atoms in the material within the range of from 1:1 to 2:1 in combination with (b) at least 0.5 percent by weight of boron, said resinous material being selected from the group consisting of polyester resins, phenol-aldehyde resins, butadiene polymers, butadiene-styrene copolymers, butadiene-acrylonitrile copolymers, polyethylene, and plastisols, the tube being of such a shape and disposed within the container in such a manner that any straight line passing through the end of the tube from the radioactive area will pass through at least 40% of the total length of said resinous composition within the container, said resinous composition being present within said container in an amount such that approximately 40% of the length of the composition will attenuate and absorb substantially all neutrons impinging on the end wall of the casing nearest to the radioactive area.

References Cited in the file of this patent

UNITED STATES PATENTS

| | | |
|---|---|---|
| 2,716,705 | Zinn | Aug. 30, 1955 |
| 2,719,823 | Zinn | Oct. 4, 1955 |
| 2,727,996 | Rockwell et al. | Dec. 20, 1955 |
| 2,796,411 | Zirkle | June 18, 1957 |

OTHER REFERENCES

TID–5275, Research Reactors, U.S. Gov't Printing Office (1955), pages 367, 380.

The Reactor Handbook, vol. 3, "Materials," AECD–3647, declassified edition February 1955, publ. by Technical Information Service, U.S. Atomic Energy Commission, pages 7, 8.